Dec. 11, 1956 W. N. CHITTENDEN 2,773,693
POSITIVE SHANK-LOCKING MEANS FOR COLLET-HELD CUTTING TOOLS
Filed May 20, 1954
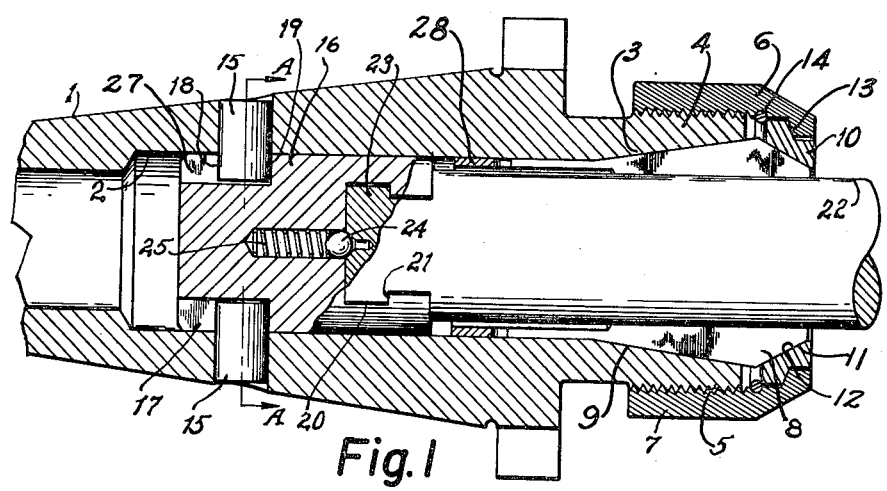
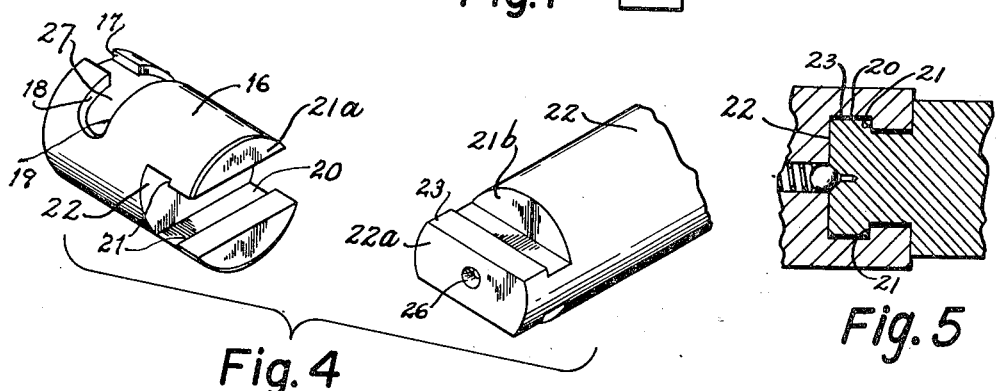
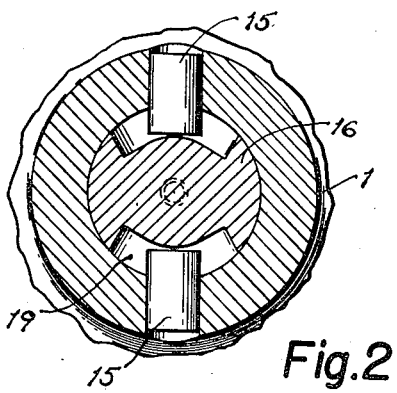
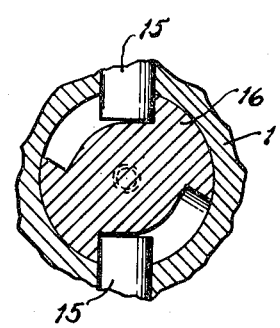
INVENTOR.
WINDSOR N. CHITTENDEN
BY
ATTY

United States Patent Office 2,773,693
Patented Dec. 11, 1956

2,773,693

POSITIVE SHANK-LOCKING MEANS FOR COLLET-HELD CUTTING TOOLS

Windsor N. Chittenden, Bedford Heights, Ohio

Application May 20, 1954, Serial No. 431,207

7 Claims. (Cl. 279—48)

This invention relates to means for holding shank-type cutters and the like. The most desirable means of holding shank-type cutters for many types of tools and work is the use of spring-type collet chucks. However, with such spring-type collet chucks as are now in wide use, there is a serious factor of the difficulty of securely holding the cutting tool particularly in that there has been no provision of means for positively precluding any longitudinal movement of the tool while in use.

In the use of spring collets for holding shank-type tools, it has always been found necessary to apply very great compressive pressures, that is, inwardly on the spring collet against the shank to prevent inadvertent twisting, slipping, or other movement of the tool in the collet or with relation to the work. An undesirable factor attendant upon the application of this very high compressive pressure has been that of distortion of the component parts of the tool holder, and the subjecting of them in some directions to stretching action when the tool is thus excessively tightened in the holder. These pressures are sometimes sufficient to greatly impair or even destroy the required initial accuracy "built into" the chuck or holder, thus rendering them unusable.

It may be stated as a general object that the purpose of this invention is to provide a tool holder of this type, for use in the tool and metalworking industries, and which insures against work being ruined due to cutter slippage or movement in the tool holder.

More specifically, it is important to assure maintaining axial concentricity with positive conveniently assembled longitudinal locking means.

In other words, an object of this invention is to provide a simple, effective, and easily assembled means for holding a tool shank in a spring-type collet chuck, which shall assure concentricity and provide secure anchoring or holding of the shank in the chuck body, preventing any longitudinal movement in the shank, and which may be readily inserted and removed from the chuck in the conventional manner.

An important result of my novel locking feature is that the collet requires much less tension or tightening force, needing only to be brought into firm gripping engagement and without subjecting it to the excessive pressures heretofore required.

A further specific object is to provide a positive driving action between the chuck body and the tool holder, eliminating the necessity for the usual excessive compressive and longitudinal strains or pressures which have heretofore been applied to the chuck in order to effect the driving of the tool by shank-gripping action alone.

In carrying out my invention, I provide an element which is normally slidably fed within a socket in the collet holder in concentric axial relation, and which has a readily detachable but close-fitting bayonet lock-holding and driving means and which may be removably secured to the end of the shank by transversely disengageable interfitting and interlocking shoulder surfaces.

A preferred embodiment of the present invention is illustrated in the accompanying drawings. It is to be understood that mechanical modifications may be made without departing from the essence of the invention as defined in the appended claims.

In the drawings, Fig. 1 is a longitudinal cross-sectional view of the spring collet-type tool holder and locking and driving means of this invention;

Figs. 2 and 3 are transverse sectional views taken on the plane A—A of Fig. 1 showing two relative positions of the driving means;

Fig. 4 is a composite view in perspective of the retaining locking and driving member and interlocking portion of the shank; and Fig. 5 is a fragmentary sectional view showing the connection between the locking and driving member with certain clearance between complementary surfaces exaggerated for clearness of illustration.

Referring particularly to Fig. 1, the chuck body is shown as provided with a socket having a cylindrically bored portion 2 from which the socket tapers outwardly along the portion 3. Outside of the end portion 4 are provided threads 5 to receive the threads of the collet tightening nut 6, the outer surface of which along the area indicated at 7 is preferably knurled to facilitate gripping it by hand for tightening.

Due to the effective driving of the present invention, more forcible tightening, as by a wrench, is usually unnecessary as will hereinafter more fully appear.

The spring collet 8 is of the multifinger or jaw type such as is commonly used. Such a collet is shown, for example, in my Patent No. 2,491,605, granted December 20, 1949.

This collet 8 has a cylindrical portion adapted to closely fit within the bore 2 and is provided with a tapered portion 9 adapted to conform to and fit with great precision within the tapered portion 3 of the socket. The outer end portions of each of the segments which form the shank gripping elements of the collet are provided with more abrupt taper or bevel surfaces adapted to be engaged by an annular ring 10 having its inner face 100 conforming to the slope or bevel of the forward portion of the collet. This ring is provided with a shoulder 13 adapted to be rotatably engaged by a corresponding shoulder formed within the nut member 6. A removable retaining spring ring 14 may be used to hold the flanged ring 10 in place in the nut while permitting relative rotation thereof and also permitting its replacement with other tightening rings to conform to different sizes of collets and corresponding slopes.

A plurality of driving pins 15 are shown as rigidly fixed in the chuck body and as projecting into the bore 2. Two of these driving pins are shown, although more may be used if desired. These are of such a size and are so positioned as to form an effective locking and driving engagement with a removable tool retaining locking and driving element 16. The rear portion of this element 16 is shown as recessed at 17, forming a longitudinal short slot-like passage communicating with enlargements extending circumferentially each way therefrom and forming spaced radial shoulders 18 and 19 between which the pins may closely fit at either side of the slot 17 during the driving engagement for either direction of rotation.

These coacting locking elements have been referred to herein as a bayonet lock for thus securing and driving the element 16 and its attached tool carrying shank, which is fitted to the opposite end of the member 16 as by a T-shape or dove-tail slot, as will presently appear. The driving element is preferably machined to fit within the bore 2 with very close tolerance which, however, provides a sliding fit with a minimum of play.

As indicated, Figs. 2 and 3 are sections taken through A—A of Fig. 1 and show the relative positions of the driving pins 15 and the driving element 16 in the unlocked entering position in Fig. 2, and the locked driving position in Fig. 3. In Fig. 3 the interlocked parts are engaged for clockwise rotation. It will be obvious that rotation of the assembly in either direction while maintaining a locked relationship between the driving pins 15 and the driving element 16 is made possible by the T-shaped recesses 27 in driving element 16.

As shown, the forward portion of the element 16 is provided with a transverse shouldered slot 20, the shoulders 21 of which coact with complementary shoulders formed on the tool carying shank 22, and which are closely fitted but which permit sliding transverse movement for engaging the shank with the locking and driving member 16.

As will be seen from Figs. 1 and 4, the locking element is provided with a T-shaped recess having parallel transverse shoulders and the shank is provided with a T-shaped tang or interlocking element which may enter the recess sliding easily transversely thereon, but which when in position has its interlocking shoulders tightly fitting at the surface 21 and 22 to prevent any relative longitudinal movement of the shank and locking and driving member 16, the end surface 21a of the driving element likewise closely fitting the shoulder 21b. The T-shaped tang designated 23 is formed on the end of the tool shank 22.

When the tool parts shown in Fig. 4 have been fitted together by sliding the tank 23 into its receiving slot, it is desired that the parts thus assembled may be handled with the same convenience as though the parts were unitary. To this end, I provide a suitable detent for holding the member 16 and the shank in axial alignment consisting of a spring-pressed ball 24 centrally positioned in the member 16 and adapted to engage a corresponding depression 26 under the action of a spring 25 formed in the end of the tang 23 at the axial center of the shank.

In Fig. 5 the interlocking portions of the T-head 23 of the shank and the T-shaped slot 27 show the parallel surfaces of the T-head, and the corresponding surfaces of the slot are preferably normally slightly spaced apart for convenience in sliding them together, while the transverse surfaces lying in the radial planes are preferably more accurately fitted as shown by the double lines, for example, at 20 and 23 in Fig. 5.

Obviously, the spring-pressed ball detent 24 will serve to hold the driving element 16 and shank in axial alignment during the assembly with the collet and collet body.

In Fig. 4 as indicated, the driving element 16 and the shank are separated before joining the parts 16 and 22, and the perspective view indicates the cooperating interlocking T-shaped tang and the receiving recess while at the other end of the element 16 one of the bayonet locking recesses appears.

The collet has surfaces for gripping the shank in the zone of its tapered surface segments, while its inner cylindrical portion 28 is normally spaced from the shank surface as shown at 29. The rearmost portion of the collet is a continuous cylindrical ring, as shown in section, to the right of which appear the usual clearance openings 29a at which the slots forming the collet segments terminate and beyond which the spring action of the collet is effected for the extremely slight movement of the shank gripping action.

It will be seen that when assembled, the driving element and shank with its collet thereon may be put into body 1 and the nut 6 with an appropriate beveled ring may be threaded onto the end of the tool holder and tightened to effectively grip the shank by the wedging action of the taper of the collet, bringing the gripping surfaces thereof into accurate engagement.

It may be noted, however, that this engagement need not be sufficient to drive the shank with its cutting tool by friction alone, and this is an important characteristic of my invention.

It will be seen that a tool maker using precision tools may select the tool and shank desired, slidably fit the spring collet onto the shank, leaving the inner or tank end of the shank projecting beyond the cylindrical inner end of the collet. The driving element is then slid onto its interfitting tang where the detent effectively holds the axial alignment while the shank and collet are positioned and secured and tightened as described.

To remove the tool from the holder, the nut 6 may be removed. The tightening ring 11 no longer acting to hold the collet, the tool and shank may be turned to bring the driving pins opposite the communicating slot 17 in the driving cavities and the tool may be removed. If the tool on the shank is larger than the inner diameter of the ring 11, obviously the ring collet and nut are put onto the shank before assembling the driving element on the inner end of the shank.

Since the socket portion of this assembly has not been substantially altered to provide the freedom from longitudinal movement, the socket may be used in the ordinary manner with a collet fitted to it to hold tools not modified in the tang portion to fit in a driving element.

Other modes of applying the principles of this invention may be employed instead of those specifically set forth above, changes being made as regards the details herein disclosed, provided the elements set forth in any of the following claims, or the equivalent of such be employed.

It is therefore particularly pointed out and distinctly claimed as the invention:

1. In a device for holding shank-type cutting tools the combination of a chuck body and a cylindrical bored portion and an outwardly tapered socket extended therefrom, a spring-type collet having exterior surfaces complementary to said bore and taper, a cylindrical tool shank adapted to be gripped by the collet and means for engaging and moving the collet in the taper to effect such gripping and axial aligning action of chuck body and collet and shank, a locking and driving element fitting into the cylindrical bore portion, a projection rigid with the chuck body removably engaging and coacting with said element for effecting a driving action while preventing longitudinal movement thereof, a transversely slidable interlocking shoulder on said element and on said shank whereby the shank and element may be assembled outside of the chuck and inserted therein.

2. The combination described in claim 1 in which the locking element and shank are provided with a coacting resilient latching means.

3. The combination described in claim 1 in which the locking and driving element is provided with a spring pressed ball detent, and the shank is provided with a depression at its inner end coacting with the ball to prevent displacement of the assembled driving element and shank while permitting ready separation when removed from the chuck body.

4. In a machine tool holding socket, the combination of a plurality of radical driving pins, a removable tool retaining locking and driving element having means for effecting a bayonet locking engagement therewith, the forward end of said retaining locking and driving element being provided with a recessed transverse shouldered slot having opposed shoulders parallel to a diameter of said element and adapted to receive a complementary shaped tang at the free end of a tool shank, and detent means for maintaining said driving element and said tool shank in axial alignment.

5. In a device for holding shank-type cutting tools, the combination of a collect removably fitted into the socket and provided with a bore to receive a tool shank, a collar screw-threaded to the free end of said socket and being flanged to engage the outer end of said collet, a plurality of radial driving pins rigid with the socket, a removable tool-retaining locking and driving element adapted to slidably fit into the socket and having shoulders shaped for effecting bayonet locking engagement with said pins, the outer end of said retaining locking and driving element being provided with transverse shoulders forming a recess adapted to receive a complementary shaped tang at the end of a tool shank, and means for holding the tool shank and said driving element in axial alignment.

6. In combination a socket having an axial bore, a collet removably fitted in the socket and provided with a bore to receive a tool shank and having an elongated cylindrical skirt, a collar screw threaded to the outer end of said socket and flanged to engage the outer end of said collet, a pair of diametrically opposed radial driving pins in said socket, a removable tool retaining locking and driving element having means for effecting a bayonet locking engagement with said pins and being of a diameter closely fitting into the bore in said socket and equal to the outside diameter of the skirt of said collet, the forward end of said retaining locking and driving element being provided with a substantially T-shaped transversely shouldered slot adapted to receive in axially fixed and aligned relationship a complementary substantially T-shaped tang at the free end of a tool shank.

7. A device for holding cylindrical shank-type cutting tools including a chuck body having a cylindrical bore and an outwardly tapered socket extending therefrom, a collet comprising segmental fingers fitting the tapered socket and being yieldably integrally connected with a cylindrical skirt portion adapted to fit the bore while the inner surfaces of the collet fingers engage the cylindrical shank, means for urging the collet into the taper for gripping and accurately aligning the tool shank, a tool driving and securing means for holding the shank from longitudinal movement and including an element having trasversely shouldered engagement with the tool shank and including surfaces preventing relative axial movement, said element fitting said bore and having external slots forming shoulders, driving pins engaging said shoulder and preventing longitudinal movement of said element, and a connection between said element and said shank for holding them in axial alignment when removed from the bore.

References Cited in the file of this patent

UNITED STATES PATENTS

| | | |
|---|---|---|
| 339,595 | Stone | Apr. 6, 1886 |
| 742,598 | Costello | Oct. 27, 1903 |
| 1,332,898 | Hossie | Mar. 9, 1920 |
| 1,705,038 | Thomas | Mar. 12, 1929 |
| 2,477,058 | Harborne et al. | July 26, 1949 |

FOREIGN PATENTS

| | | |
|---|---|---|
| 597,070 | Great Britain | 1948 |